(12) United States Patent
Javeri et al.

(10) Patent No.: US 11,646,049 B2
(45) Date of Patent: May 9, 2023

(54) SYSTEMS AND METHODS FOR UTILIZING MODELS TO PREDICT HAZARDOUS DRIVING CONDITIONS BASED ON AUDIO DATA

(71) Applicants: VERIZON CONNECT IRELAND LIMITED, Dublin (IE); Verizon Patent and Licensing Inc., Basking Ridge, NJ (US)

(72) Inventors: Vipul Shyam Javeri, Sandy Springs, GA (US); Mourya C. Darivemula, Sugar Hill, GA (US); Jeyanth Paul John Britto, Alpharetta, GA (US); Nishitha Reddy Nalla, Atlanta, GA (US); Aaroon Thowfiq Shahul Hameed, Alpharetta, GA (US); Douglas Coimbra De Andrade, Florence (IT); Jin Soo Cho, Chattanooga, TN (US); Ianemmanuel P Crueldad, Pomona, CA (US)

(73) Assignees: Verizon Connect Development Limited, Dublin (IE); Verizon Patent and Licensing Inc., Basking Ridge, NJ (US)

(*) Notice: Subject to any disclaimer, the term of this patent is extended or adjusted under 35 U.S.C. 154(b) by 87 days.

(21) Appl. No.: 17/302,466

(22) Filed: May 4, 2021

(65) Prior Publication Data

US 2022/0358950 A1 Nov. 10, 2022

(51) Int. Cl.
*G10L 25/51* (2013.01)
*G10L 21/0232* (2013.01)
(Continued)

(52) U.S. Cl.
CPC ............. *G10L 25/51* (2013.01); *G06F 3/165* (2013.01); *G06N 20/00* (2019.01); *G08G 1/0962* (2013.01);
(Continued)

(58) Field of Classification Search
CPC ...... G10L 25/51; G10L 21/0232; G10L 25/18; G10L 25/24; H04R 3/04; H04R 2430/01; H04R 2499/13; G06F 3/165; G06N 20/00
See application file for complete search history.

(56) References Cited

U.S. PATENT DOCUMENTS

2021/0103747 A1* 4/2021 Moustafa ............. G06V 20/584

OTHER PUBLICATIONS

Carreira et al., "Quo Vadis, Action Recognition? A New Model and the Kinetics Dataset," Feb. 12, 2018, arXiv:1705.07750v3, Website: https://arxiv.org/pdf/1705.07750.pdf, 10 Pages.
(Continued)

*Primary Examiner* — David L Ton

(57) ABSTRACT

A vehicle device may receive audio data and other vehicle data associated with a vehicle and may transform the audio data to transformed audio data in a frequency domain. The vehicle device may segment the transformed audio data into a plurality of audio segments and may process the plurality of audio segments, with different feature extraction techniques, to extract a plurality of feature vectors. The vehicle device may merge the plurality of feature vectors into a merged feature vector and may create an audio signature for the audio data based on the merged feature vector. The vehicle device may process the audio signature and the other vehicle data, with a model, to determine a classification of the audio signature and may perform one or more actions based on the classification of the audio signature.

20 Claims, 10 Drawing Sheets

(51) Int. Cl.
*G10L 25/24* (2013.01)
*G10L 25/18* (2013.01)
*G06F 3/16* (2006.01)
*H04R 3/04* (2006.01)
*G08G 1/0962* (2006.01)
*G06N 20/00* (2019.01)
*B60Q 9/00* (2006.01)

(52) U.S. Cl.
CPC .......... *G10L 21/0232* (2013.01); *G10L 25/18* (2013.01); *G10L 25/24* (2013.01); *H04R 3/04* (2013.01); *B60Q 9/00* (2013.01); *H04R 2430/01* (2013.01); *H04R 2499/13* (2013.01)

(56) References Cited

OTHER PUBLICATIONS

Jovanovic, "How does Shazam work? Music Recognition Algorithms, Fingerprinting, and Processing," 2015, Website: https://www.toptal.com/algorithms/shazam-it-music-processing-fingerprinting-and-recognition, 17 Pages.

"Creating your own Shazam (identify songs) with Python through audio fingerprinting in Ubuntu 18.04," Jul. 6, 2019, Website: https://ourcodeworld.com/articles/read/973/creating-your-own-shazam-identify-songs-with-python-through-audio-fingerprinting-in-ubuntu-18-04, 6 Pages.

\* cited by examiner

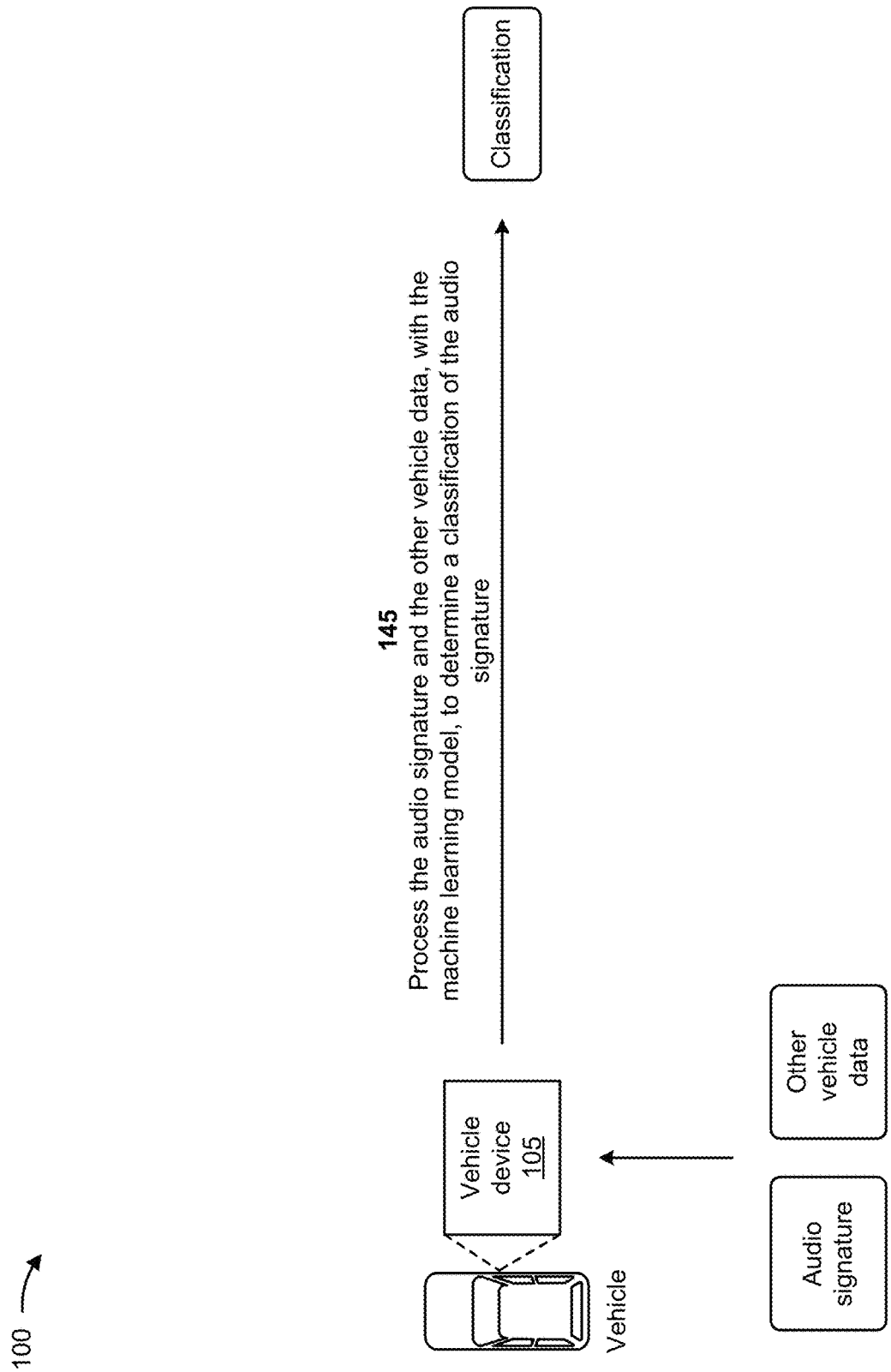

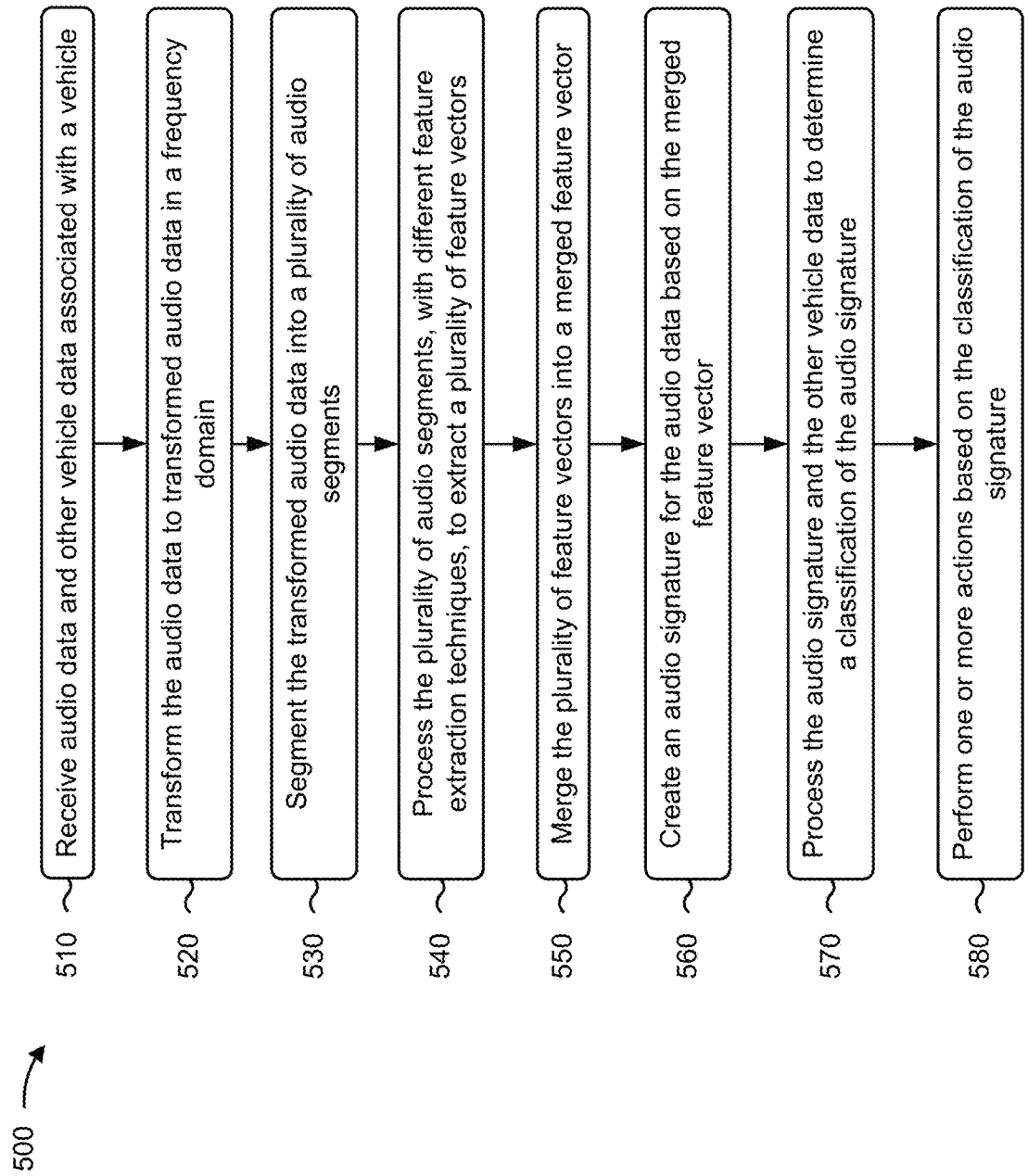

SYSTEMS AND METHODS FOR UTILIZING MODELS TO PREDICT HAZARDOUS DRIVING CONDITIONS BASED ON AUDIO DATA

BACKGROUND

Vehicle telematics devices enable vehicle fleet managers to keep vehicles and drivers safe, as well as assets being transported by the vehicles. For example, vehicle tracking units may provide location information (e.g., from global positioning system (GPS) sensors), video data (e.g., from on-vehicle camera devices), a safety score, and/or the like, which enables fleet managers to perform location tracking, set up boundary and speed alerts, assist with stolen vehicles, promote safe driving, and/or the like.

BRIEF DESCRIPTION OF THE DRAWINGS

FIGS. 1A-1F are diagrams of an example associated with predicting hazardous driving conditions based on audio data.

FIG. 5 is a flowchart of an example process associated with predicting hazardous driving conditions based on audio data.

DETAILED DESCRIPTION OF PREFERRED EMBODIMENTS

Figure 1A:
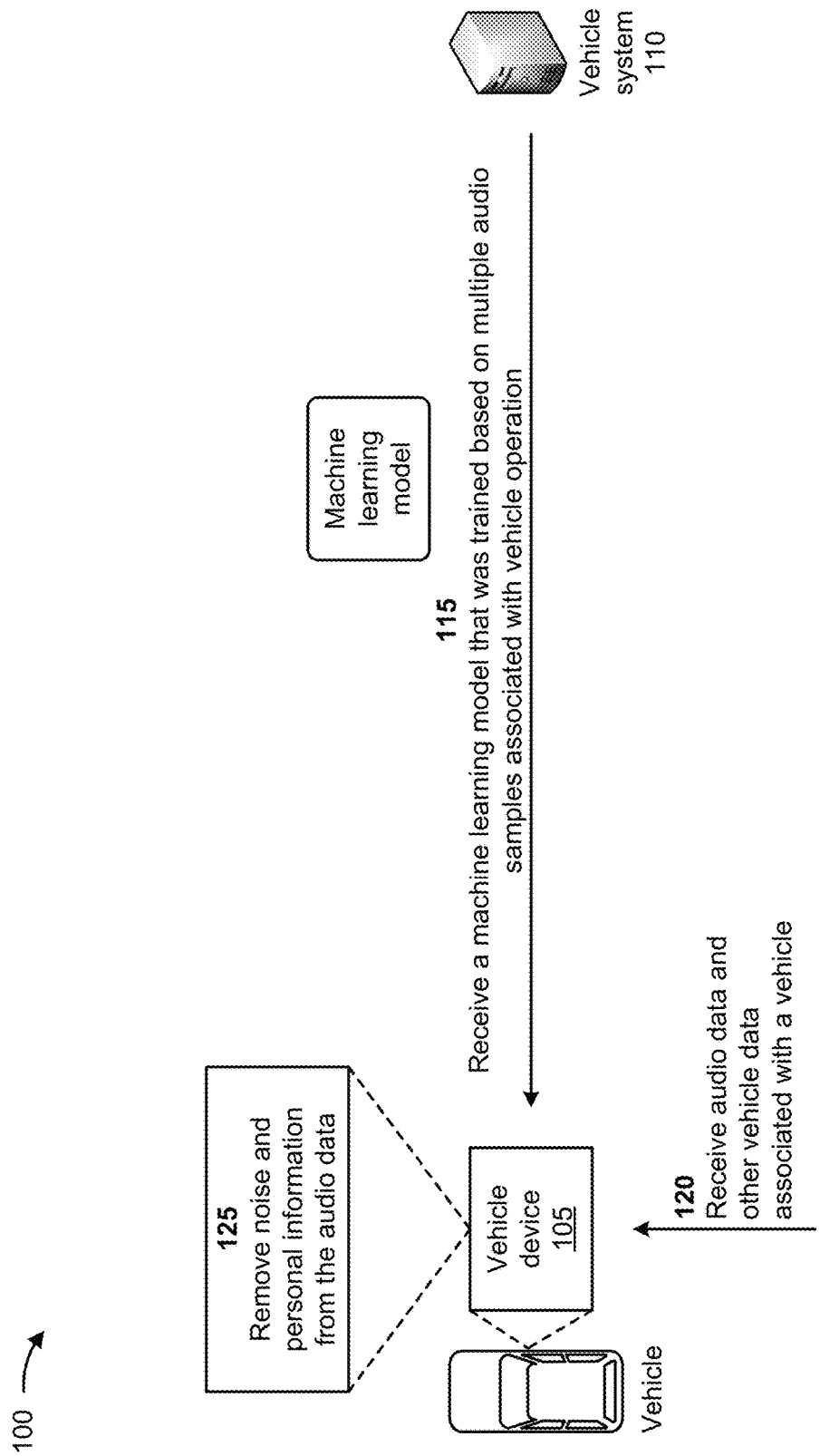

The following detailed description of example implementations refers to the accompanying drawings. The same reference numbers in different drawings may identify the same or similar elements.

Current techniques for detecting a vehicle crash and/or harsh driving conditions utilize accelerometer data, gyroscope data, and video data. Such techniques are unable to detect other vehicle conditions, such as vehicle wear on engines, tires, brakes, and/or the like, which also contribute to hazardous driving events. Video-based techniques are also hampered by visibility issues caused by harsh weather conditions (e.g., pouring rain, blizzard conditions, and/or the like) and/or time of day conditions (e.g., sun glare). Further, video data may always be available in order to determine the condition of the vehicle.

Thus, current techniques for detecting a vehicle crash and/or harsh driving conditions waste computing resources (e.g., processing resources, memory resources, communication resources, and/or the like), networking resources, transportation resources, emergency resources, and other resources associated with handling vehicle accidents caused by worn engines, worn tires, worn brakes, and/or the like, losing vehicle in-service time caused by vehicle maintenance issues, dispatching emergency personnel for vehicle accidents, handling legal issues associated with vehicle accidents, among other examples.

Some implementations described herein provide a vehicle device that predicts hazardous driving conditions based on audio data and by utilizing machine learning techniques, pitch tracking models (e.g., Yet Another Algorithm for Pitch Tracking (YAAPT) pitch tracking models), and/or the like. The vehicle device may also detect and/or predict various dangerous driving events, inappropriate road and vehicle conditions, and/or the like that would not be possible without the audio data. For example, the vehicle device may receive audio data and other vehicle data associated with a vehicle and may transform the audio data to transformed audio data in a frequency domain. The vehicle device may segment the transformed audio data into a plurality of audio segments and may process the plurality of audio segments, with different feature extraction techniques, to extract a plurality of feature vectors. The vehicle device may merge the plurality of feature vectors into a merged feature vector and may create an audio signature for the audio data based on the merged feature vector. The vehicle device may process the audio signature and the other vehicle data, with, for example, a machine learning model, to determine a classification of the audio signature and may perform one or more actions based on the classification of the audio signature.

In this way, the vehicle device may classify and predict hazardous driving conditions based on audio data. For example, the vehicle device may utilize captured audio as an extra input to aid in detection of hazardous driving conditions. By combining audio data and inertial measurement unit (IMU) data, with a classification technique (e.g., a machine learning model), the vehicle device may improve driver and road safety by identifying hazardous events that would otherwise be difficult to detect or not be detected at all without the use of audio data. Thus, the vehicle device may conserve computing resources, networking resources, transportation resources, emergency resources, and other resources that would otherwise be consumed with handling vehicle accidents caused by worn engines, worn tires, worn brakes, and/or the like, losing vehicle in-service time caused by vehicle maintenance issues, dispatching emergency personnel for vehicle accidents, handling legal issues associated with vehicle accidents, and/or the like.

FIGS. 1A-1F are diagrams of an example 100 associated with utilizing a machine learning model to predict hazardous driving conditions based on audio data. As shown in FIGS. 1A-1F, example 100 includes a vehicle, a vehicle device 105, and a vehicle system 110. The vehicle may include a car, a truck, a motorcycle, a bus, a boat, farm equipment, construction equipment, among other examples. In some examples, the vehicle may include an autonomous vehicle, a semiautonomous vehicle, or a non-autonomous vehicle. Further details of the vehicle device 105 and the vehicle system 110 are provided elsewhere herein.

As shown in FIG. 1A, and by reference number 115, the vehicle device 105 may receive, from the vehicle system 110, audio classifiers (e.g., machine learning models) that were determined and/or trained based on multiple audio samples associated with vehicle operation, hazardous events, severities of the hazardous events, and/or the like. The machine learning model may include a classifier machine learning model. The audio samples associated with vehicle operation may include audio samples associated with worn brake pads, worn tires, anomalous engine noises, normally operating brake pads, normally operating tires, normally operating engines, and/or the like. The audio samples associated with hazardous events may include audio samples associated with pothole impacts, hydroplaning, glass shattering, tires screeching, vehicle impact, deployment of airbags, harsh weather conditions, hazardous road conditions, and other audio data relevant to detecting hazardous events. Each of the audio samples may include an audio signature that includes characteristics, such as an average zero crossing rate, an estimated tempo, an average spectrum, a spectral flatness, prominent tones across a set of frequency bands, a bandwidth, and/or the like.

As further shown in FIG. 1A, and by reference number 120, the vehicle device 105 may receive audio data and other vehicle data associated with the vehicle. The audio data may include audio captured by the vehicle device (e.g., an in-cabin microphone, a mobile device, a telemetric device, a voice assistant, a vehicle camera, and/or the like) in real-time or near real-time relative to generation of the audio. The other vehicle data may include data identifying a location of the vehicle, an acceleration of the vehicle, a velocity of the vehicle, gyroscope data associated with the vehicle (e.g., inertial measurement unit data), video data associated with the vehicle, and/or the like.

As further shown in FIG. 1A, and by reference number 125, the vehicle device 105 may remove noise and personal information from the audio data. For example, the vehicle device 105 may filter the audio data to remove in-cabin conversation, music, weather audio, road noise, cabin ambient noise, and/or the like from the audio data. The vehicle device 105 may apply a low-pass filter (e.g., a low-pass Butterworth filter, a first order filter, a second order filter, a resistor-capacitor filter, and/or the like) or filters, to the audio data, to remove noise and personal information from the audio data. The low-pass filter may filter the audio data with frequencies in a voice range (e.g., one-hundred and twenty Hertz (Hz) to fifty kilohertz (kHz)) so that personal conversations of passengers in the vehicle (e.g., personal information) are removed from the audio data. The low-pass filter may also filter out the audio data associated with music being played in the vehicle, weather (e.g., rain or sleet striking a windshield of the vehicle), road noise (e.g., humming of tires of the vehicle), cabin ambient noise (e.g., windshield wiper operation or ventilation operation of the vehicle), and/or the like.

Figure 1B:
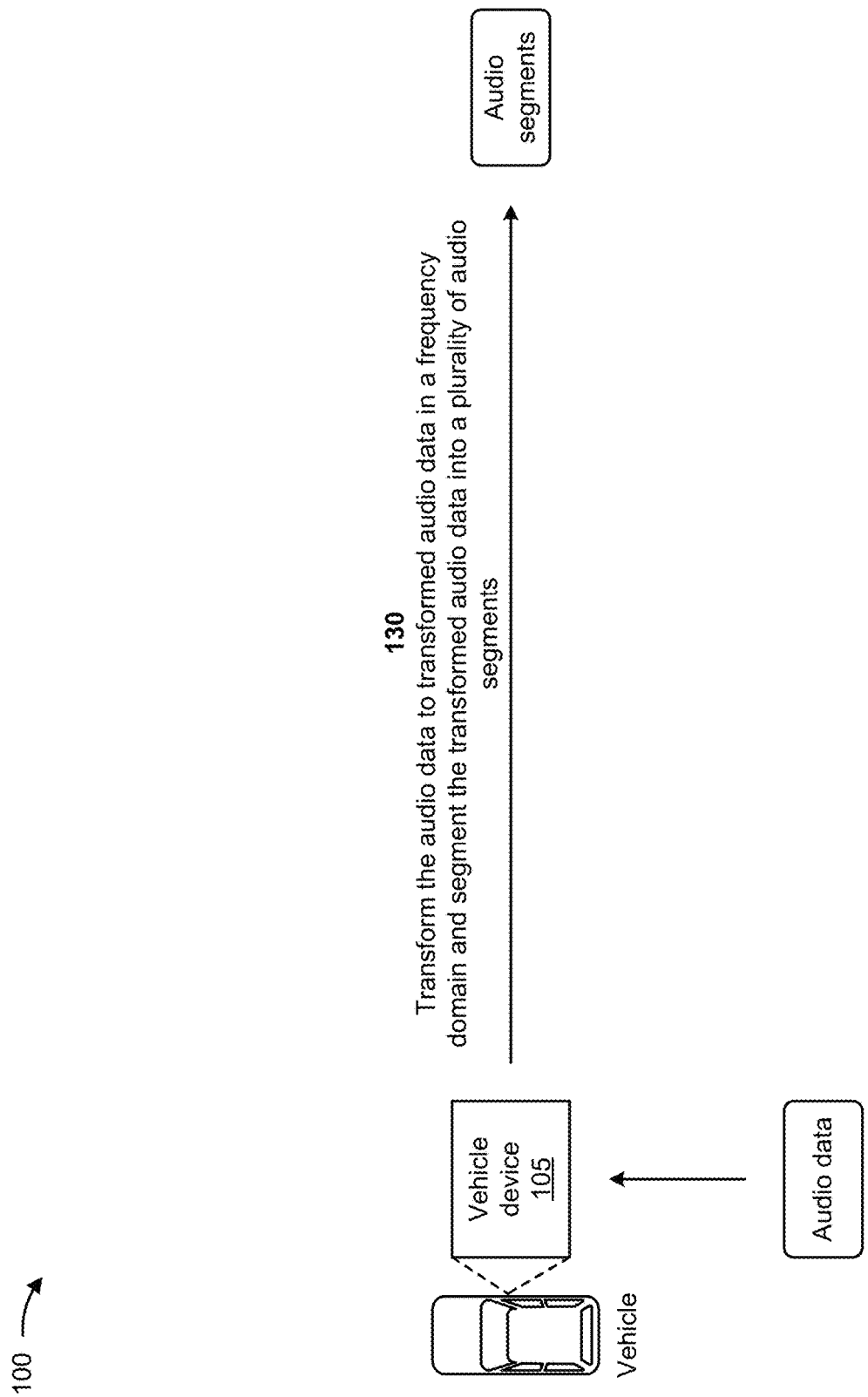

As shown in FIG. 1B, and by reference number 130, the vehicle device 105 may transform the audio data to transformed audio data in the frequency domain and may segment the transformed audio data into a plurality of audio segments. For example, the vehicle device 105 may apply a Fourier transform (e.g., a short time Fourier transform), to the audio data, to transform the audio data to the transformed audio data in the frequency domain. The vehicle device 105 may segment the transformed audio data into the plurality of audio segments by dividing the transformed audio data into a predetermined quantity of audio segments. The audio segments may include the same lengths, may have different lengths, and/or the like. The predetermined quantity of audio segments may include a quantity of audio segments that enable the vehicle device 105 to utilize multiple different feature extraction techniques to extract a plurality of feature vectors from the plurality of audio segments, as described below.

Figure 1C:
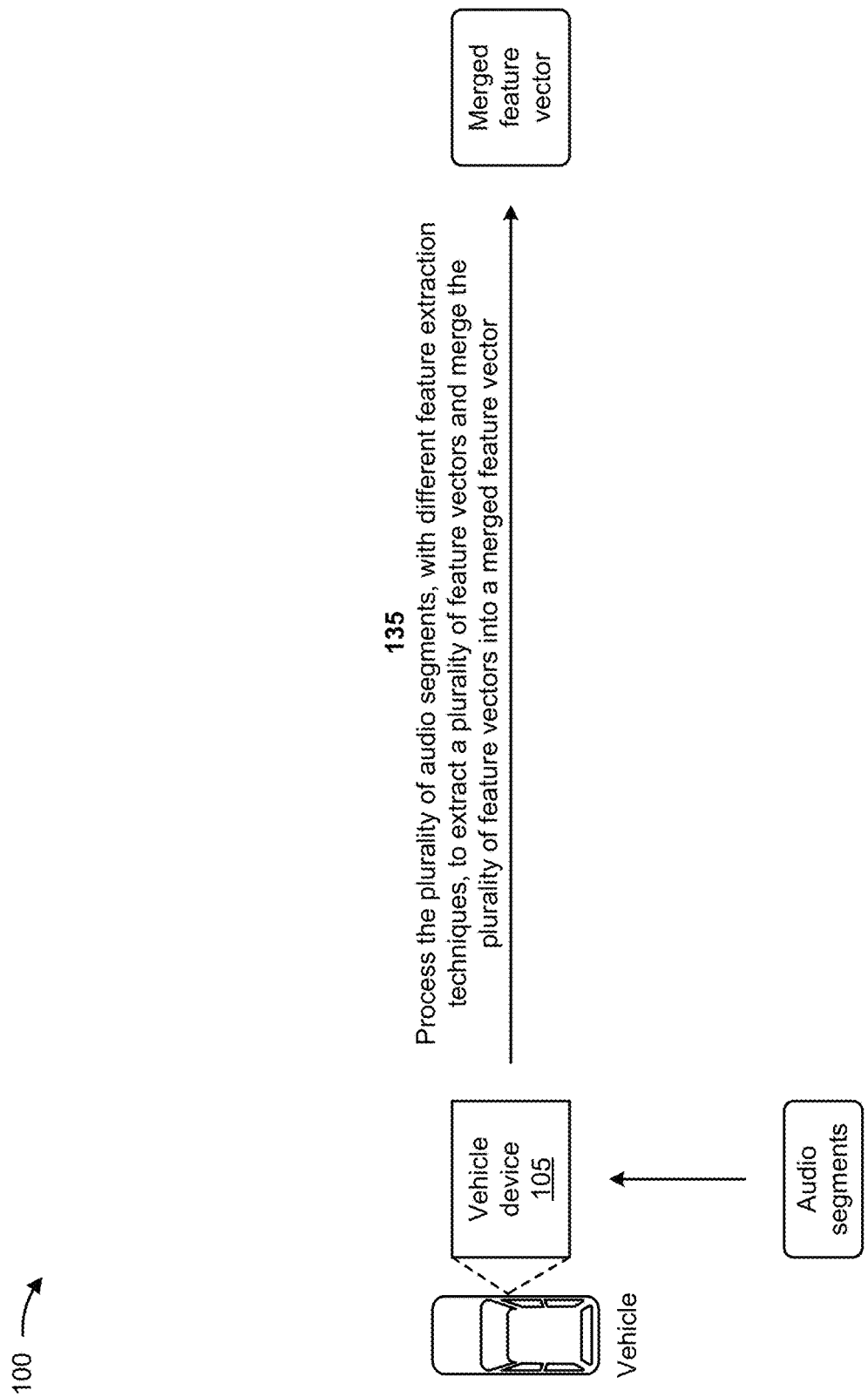

As shown in FIG. 1C, and by reference number 135, the vehicle device 105 may process the plurality of audio segments, with different feature extraction techniques, to extract a plurality of feature vectors. For example, the vehicle device 105 may process the plurality of audio segments, with a Mel-frequency cepstral coefficient technique, to extract Mel-frequency cepstral coefficient feature vectors for the plurality of audio segments. The vehicle device 105 may extract Mel-frequency cepstral coefficients for the plurality of audio segments and may calculate an average Mel-frequency cepstral coefficient and a standard deviation of the average Mel-frequency cepstral coefficient based on the Mel-frequency cepstral coefficients. The vehicle device 105 may extract the Mel-frequency cepstral coefficient feature vectors for the plurality of audio segments based on the average Mel-frequency cepstral coefficient and the standard deviation of the average Mel-frequency cepstral coefficient.

In another example, the vehicle device 105 may process the plurality of audio segments, with a spectral centroid and spectral roll off technique, to extract spectral centroid and spectral roll off feature vectors for the plurality of audio segments. The vehicle device 105 may extract spectral centroids and spectral roll offs for the plurality of audio segments and may calculate an average spectral centroid and spectral roll off and a standard deviation of the average spectral centroid and spectral roll off based on the spectral centroids and spectral roll offs. The vehicle device 105 may extract the spectral centroid and spectral roll off feature vectors for the plurality of audio segments based on the average spectral centroid and spectral roll off and the standard deviation of the average spectral centroid and spectral roll off.

In still another example, the vehicle device 105 may process the plurality of audio segments, with a zero crossing and maximum root mean square technique, to extract zero crossing and maximum root mean square feature vectors for the plurality of audio segments. The vehicle device 105 may extract zero crossings and maximum root mean squares for the plurality of audio segments and may calculate an average zero crossing and maximum root mean square and a standard deviation of the average zero crossing and maximum root mean square based on the zero crossings and maximum root mean squares. The vehicle device 105 may extract the zero crossing and maximum root mean square feature vectors for the plurality of audio segments based on the average zero crossing and maximum root mean square and the standard deviation of the average zero crossing and maximum root mean square.

In yet another example, the vehicle device 105 may process the plurality of audio segments, with a chroma technique, to extract chroma feature vectors for the plurality of audio segments. The vehicle device 105 may extract chromas for the plurality of audio segments and may calculate an average chroma and a standard deviation of the average chroma based on the chromas. The vehicle device 105 may extract the chroma feature vectors for the plurality of audio segments based on the average chroma and the standard deviation of the average chroma.

Based on such examples, the plurality of feature vectors may include the Mel-frequency cepstral coefficient feature vectors, the spectral centroid and spectral roll off feature vectors, the zero crossing and maximum root mean square feature vectors, and the chroma feature vectors.

As further shown in FIG. 1C, and by reference number 135, the vehicle device 105 may merge the plurality of feature vectors into a merged feature vector. For example, the vehicle device 105 may merge the Mel-frequency cepstral coefficient feature vectors, the spectral centroid and spectral roll off feature vectors, the zero crossing and maximum root mean square feature vectors, and the chroma feature vectors into the merged feature vector. The vehicle device 105 may merge the plurality of feature vectors into the merged vector by concatenating the plurality of feature vectors with a combination function. For example, if there are three feature vectors (x, y, z), then these feature vectors may be concatenated with a combination function (e.g., c(x, y, z)).

Figure 1D:
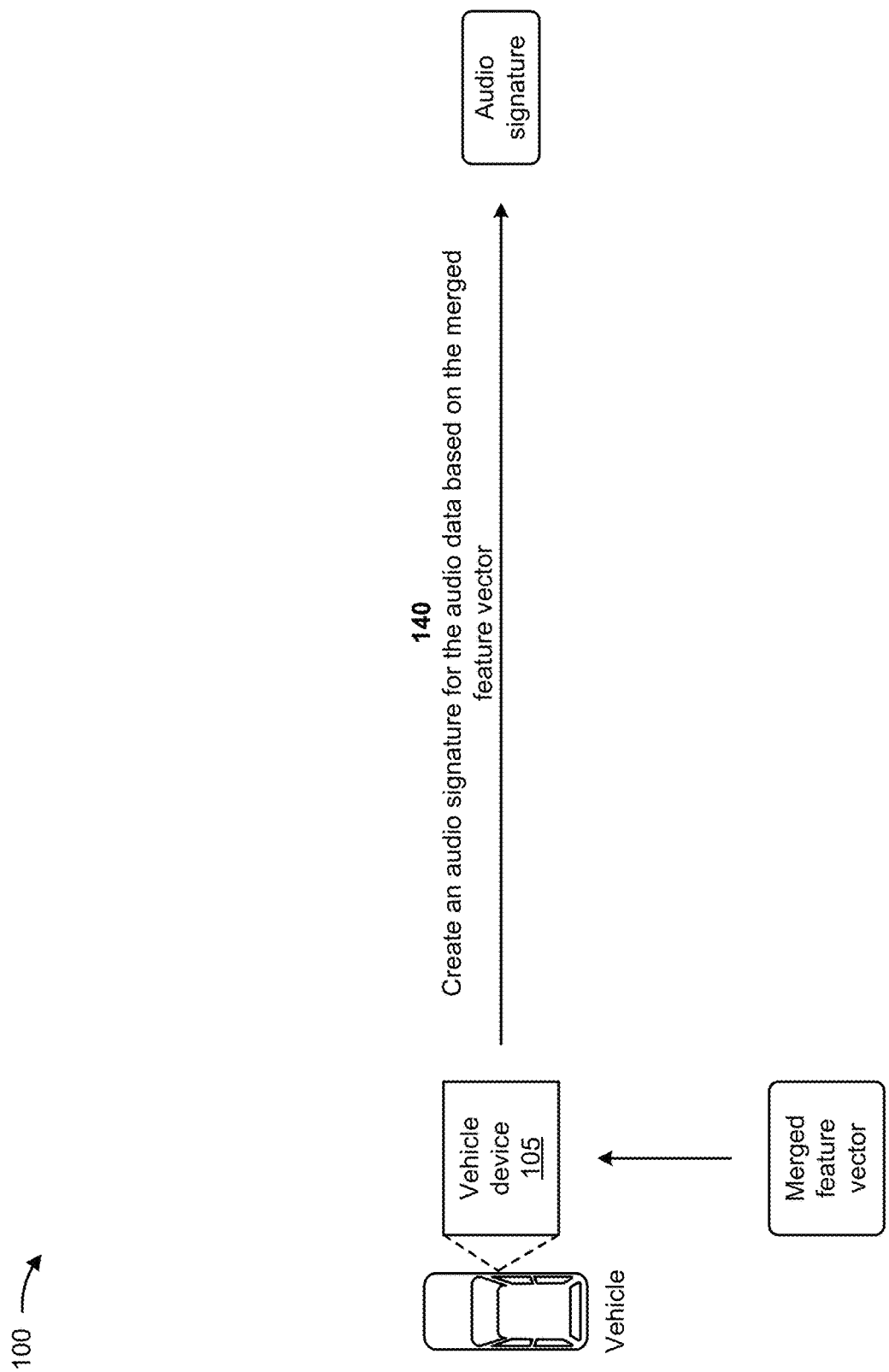

As shown in FIG. 1D, and by reference number 140, the vehicle device 105 may create an audio signature for the audio data based on the merged feature vector. For example, the features of the plurality of feature vectors may be represented in the merged feature vector. The features may identify audio patterns or signatures associated with the audio data. The vehicle device 105 may create the audio signature based on the audio signatures represented in the merged feature vector. The audio signature may include a condensed digital summary (e.g., an audio a fingerprint), deterministically generated from the merged feature vector, that may be used to identify an audio sample. The audio signature may include characteristics, such as an average zero crossing rate, an estimated tempo, an average spectrum, a spectral flatness, prominent tones across a set of frequency bands, bandwidth, and/or the like.

As shown in FIG. 1E, and by reference number 145, the vehicle device 105 may process the audio signature and the other vehicle data (e.g., with the machine learning model, a YAAPT pitch tracking model, identification and tracking of voice formats, and/or the like) to determine a classification of the audio signature. For example, the machine learning model may compare the audio signature and the other vehicle data, to historical audio signatures and historical vehicle data utilized to train the machine learning model, to determine which of the historical audio signatures and the historical vehicle data most closely matches the audio signature and the other vehicle data. A classification of the most closely matching historical audio signature may be determined as the classification of the audio signature. Further features of the machine learning model are provided below in connection with FIG. 2. In this way, the audio signature adds valuable information to the other vehicle data, which may be utilized by the machine learning model to classify the audio signature. For example, a difference between harsh braking that is barely enough to avoid a collision and braking in which the vehicle bumps into another vehicle may be associated with a distinctive "bump" sound that the vehicle device 105 is able to capture and utilize.

In some implementations, the classification of the audio signature includes a screeching tire classification, a squealing classification, a glass shattering classification, an engine noise level classification, a harsh weather condition classification, a hazardous road condition classification, a normal vehicle operation classification, a loud music classification, a continuous exposure to noise classification, and/or the like. The loud music classification may enable the vehicle device 105 to detect when a driver is listening to loud music while driving, which is usually not desirable. A speed of the vehicle may indicate that the vehicle is moving and the vehicle device 105 may identify an audio intensity of the music. If the audio intensity satisfies a threshold intensity (e.g., the loud music classification), the vehicle device 105 may alert a fleet manager of the vehicle and/or may trigger in-cabin alerts (e.g., an audible alert played while the loud music is paused, a visual alert via a heads-up display or a dash display, a haptic alert such as a vibrating steering wheel) for the driver.

In some industries, drivers need to operate vehicles under noisy environmental conditions (e.g., heavy construction, abnormally high traffic, and/or the like). In these situations, the vehicle device 105 may identify a driver that has been overexposed to noise (e.g., via the continuous exposure to noise classification) and may take appropriate measures. For example, a speed of the vehicle may indicate that the vehicle is moving for a time period and the vehicle device 105 may identify an audio intensity of the noise during the time period. If the audio intensity satisfies a threshold intensity (e.g., the continuous exposure to noise classification) for a threshold time period, the vehicle device 105 may alert a fleet manager of the vehicle and/or may trigger in-cabin alerts for the driver.

Figure 1F:
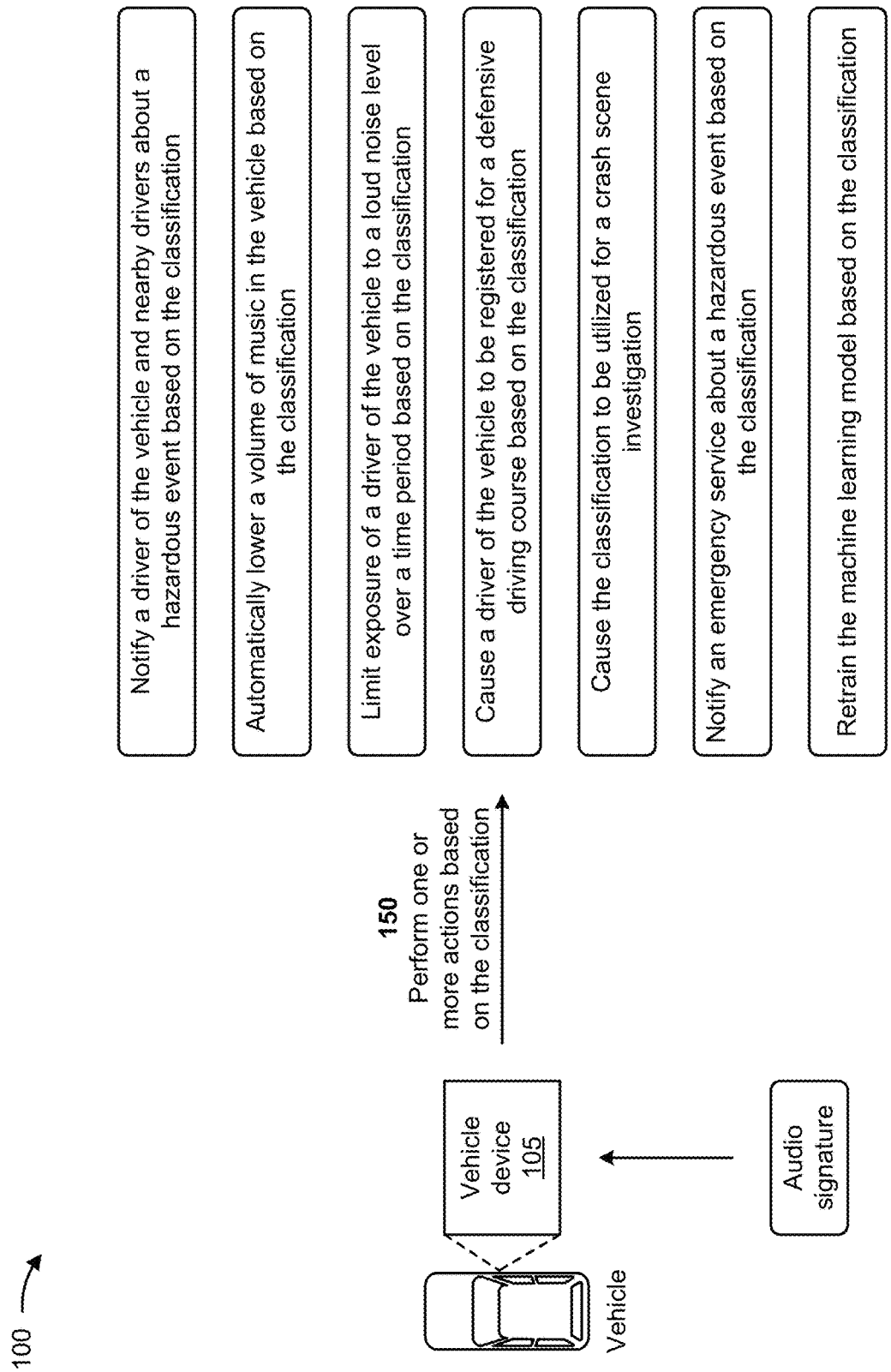

As shown in FIG. 1F, and by reference number 150, the vehicle device 105 may perform one or more actions based on the classification. In some implementations, the one or more actions include the vehicle device 105 notifying a driver of the vehicle, and drivers located within a predetermined distance from the vehicle, about a hazardous event based on the classification. For example, the classification may indicate that the vehicle is near a location of the traffic accident, and the vehicle device 105 may notify the driver of the vehicle (e.g., via an audible alert, a visual alert, a haptic alert, and/or the like), and drivers near the vehicle, about the location of the traffic accident so that the driver and the drivers avoid the traffic accident. In this way, the vehicle device 105 may conserve computing resources, networking resources, transportation resources, emergency resources, and other resources that would otherwise be consumed with handling vehicle accidents, dispatching emergency personnel for vehicle accidents, handling legal issues associated with vehicle accidents, and/or the like.

In some implementations, the one or more actions include the vehicle device 105 automatically lowering a volume of music in the vehicle based on the classification. For example, a speed of the vehicle may indicate that the vehicle is moving and the vehicle device 105 may identify an audio intensity of the music. If the audio intensity satisfies a threshold intensity (e.g., the loud music classification), the vehicle device 105 may automatically lower the volume of the music to prevent the driver from being distracted. In this way, the vehicle device 105 may conserve computing resources, networking resources, transportation resources, emergency resources, and other resources that would otherwise be consumed with handling vehicle accidents, dispatching emergency personnel for vehicle accidents, handling legal issues associated with vehicle accidents, and/or the like.

In some implementations, the one or more actions include the vehicle device 105 limiting exposure of a driver of the vehicle to a loud noise level over a time period based on the classification. For example, a speed of the vehicle may indicate that the vehicle is moving for a time period and the vehicle device 105 may identify an audio intensity of the noise during the time period. If the audio intensity satisfies a threshold intensity (e.g., the continuous exposure to noise classification) for a threshold time period, the vehicle device 105 may alert a fleet manager of the vehicle and/or may trigger an in-cabin alert for the driver so that the driver may be removed from the loud noise level. In this way, the vehicle device 105 may conserve computing resources, networking resources, transportation resources, emergency resources, and other resources that would otherwise be consumed with handling medical expenses associated with the driver.

In some implementations, the one or more actions include the vehicle device 105 causing a driver of the vehicle to be registered for a defensive driving course based on the classification. For example, the classification may indicate that the vehicle was involved in a traffic accident caused by the driver of the vehicle. Based on the classification, the vehicle device 105 may cause the driver to be registered for the defensive driving course. The vehicle device 105 may provide credentials of the driver to a defensive driving service and may register the driver, via the service, for the defensive driving course. The vehicle device 105 and/or the defensive driving service may notify the driver of the registration and a time period to complete the defensive driving course. In this way, the vehicle device 105 may conserve computing resources, networking resources, transportation resources, emergency resources, and other resources that would otherwise be consumed with handling insurance issues associated with the driver.

In some implementations, the one or more actions include the vehicle device 105 causing the classification to be utilized for a crash scene investigation. For example, the classification may indicate that the vehicle was involved in a traffic accident. The vehicle device 105 may provide the classification and the audio data to a crash scene investigator so that the investigator may determine whether the driver of the vehicle was at fault for the accident. The vehicle device 105 may provide the classification and the audio data to a crash scene investigation service that supports the vehicle. The service may assign a crash scene investigator to the traffic accident and the crash scene investigator may utilize the classification and the audio data to reconstruct the accident and determine whether the driver was at fault. In this way, the vehicle device 105 may conserve computing resources, networking resources, transportation resources, emergency resources, and other resources that would otherwise be consumed with handling insurance issues associated with the driver.

In some implementations, the one or more actions include the vehicle device 105 notifying an emergency service about a hazardous event based on the classification. For example, the classification may indicate that the vehicle was involved in a traffic accident. The vehicle device 105 may provide a location of the vehicle to an emergency service so that emergency personnel may be immediately dispatched to the location. The vehicle device 105 may utilize the location of the vehicle to identify a nearest emergency service so that the emergency personnel may arrive at the scene more quickly. In this way, the vehicle device 105 may conserve computing resources, networking resources, transportation resources, emergency resources, and other resources that would otherwise be consumed with handling vehicle accidents, dispatching emergency personnel for vehicle accidents, and/or the like.

In some implementations, the one or more actions include the vehicle device 105 retraining the machine learning model based on the classification. The vehicle device 105 may utilize the classification as additional training data for retraining the machine learning model, thereby increasing the quantity of training data available for training the machine learning model. Accordingly, the vehicle device 105 may conserve computing resources associated with identifying, obtaining, and/or generating historical data for training the machine learning model relative to other systems for identifying, obtaining, and/or generating historical data for training machine learning models.

In this way, the vehicle device 105 may predict hazardous driving conditions based on audio data. For example, the vehicle device 105 may utilize captured audio as an extra input to aid in detection of hazardous driving conditions. By combining audio data and IMU data, with a machine learning model, the vehicle device 105 may improve driver and road safety by identifying hazardous events that would otherwise be difficult to detect or not be detected at all without the use of audio data. Thus, the vehicle device 105 may conserve computing resources, networking resources, transportation resources, emergency resources, and other resources that would otherwise be consumed with handling vehicle accidents caused by worn engines, worn tires, worn brakes, and/or the like, losing vehicle in-service time caused by vehicle maintenance issues, dispatching emergency personnel for vehicle accidents, handling legal issues associated with vehicle accidents, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
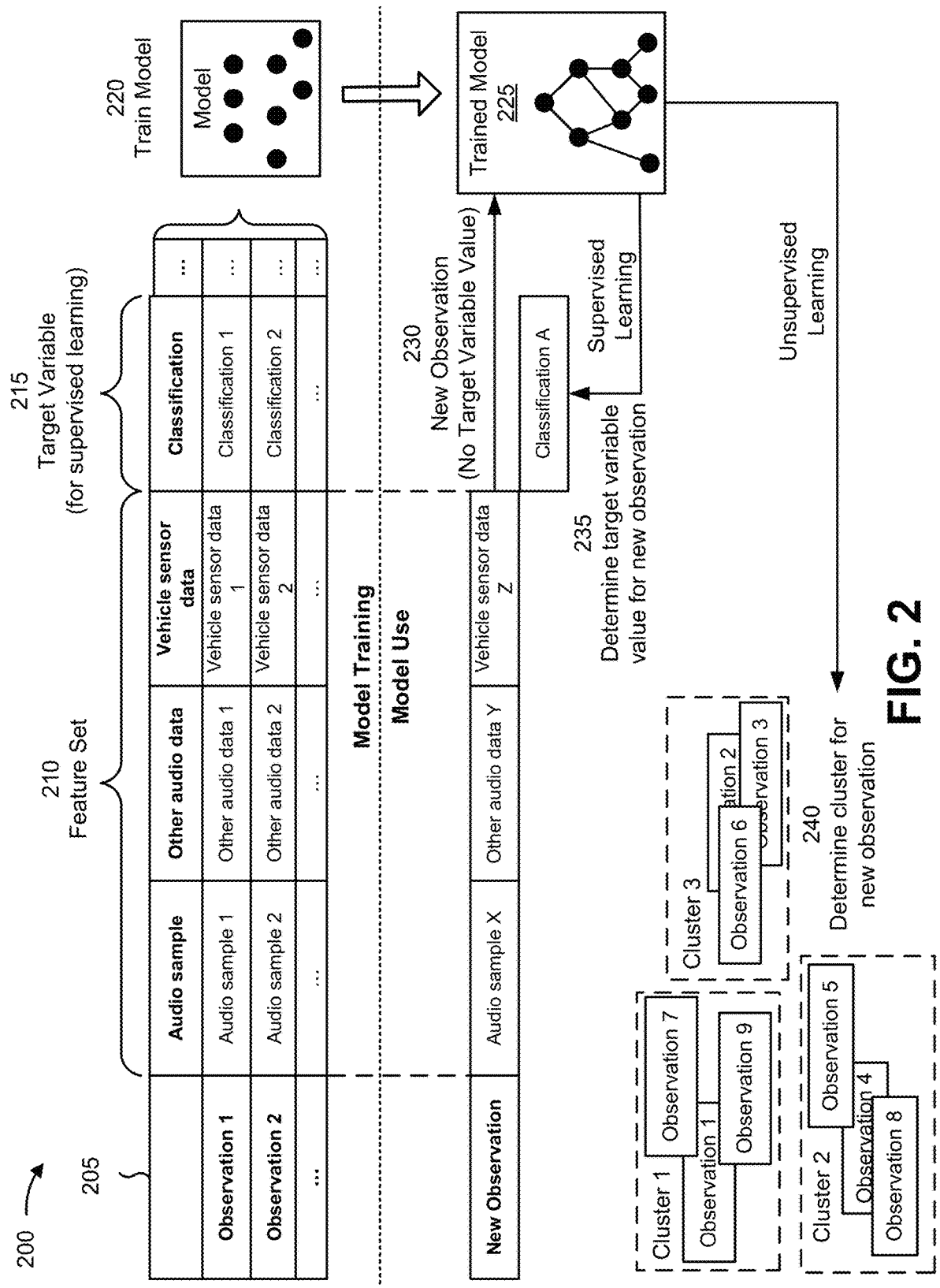
FIG. 2 is a diagram illustrating an example of training and using a machine learning model in connection with predicting hazardous driving conditions based on audio data.

FIG. 2 is a diagram illustrating an example 200 of training and using a machine learning model (e.g., the neural network models) in connection with predicting hazardous driving conditions based on audio data. The machine learning model training and usage described herein may be performed using a machine learning system. The machine learning system may include or may be included in a computing device, a server, a cloud computing environment, and/or the like, such as the vehicle device 105 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the vehicle device 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the vehicle device 105. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of an audio sample, a second feature of other audio data, a third feature of vehicle sensor data, and so on. As shown, for a first observation, the first feature may have a value of audio sample 1, the second feature may have a value of other audio data 1, the third feature may have a value of vehicle sensor data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a classification, which has a value of classification 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of audio sample X, a second feature of other audio data Y, a third feature of vehicle sensor data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of classification A for the target variable of the classification for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an audio sample cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., other audio data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to predict hazardous driving conditions based on audio data. The machine learning system enables recognition and/or identification of tens, hundreds, thousands, or millions of features and/or feature values for tens, hundreds, thousands, or millions of observations, thereby increasing accuracy and consistency and reducing delay associated with predicting hazardous driving conditions based on audio data relative to requiring computing resources to be allocated for tens, hundreds, or thousands of operators to manually predict hazardous driving conditions based on audio data.

As indicated above, FIG. 2 is provided as an example. Other examples may differ from what is described in connection with FIG. 2.

Figure 3:
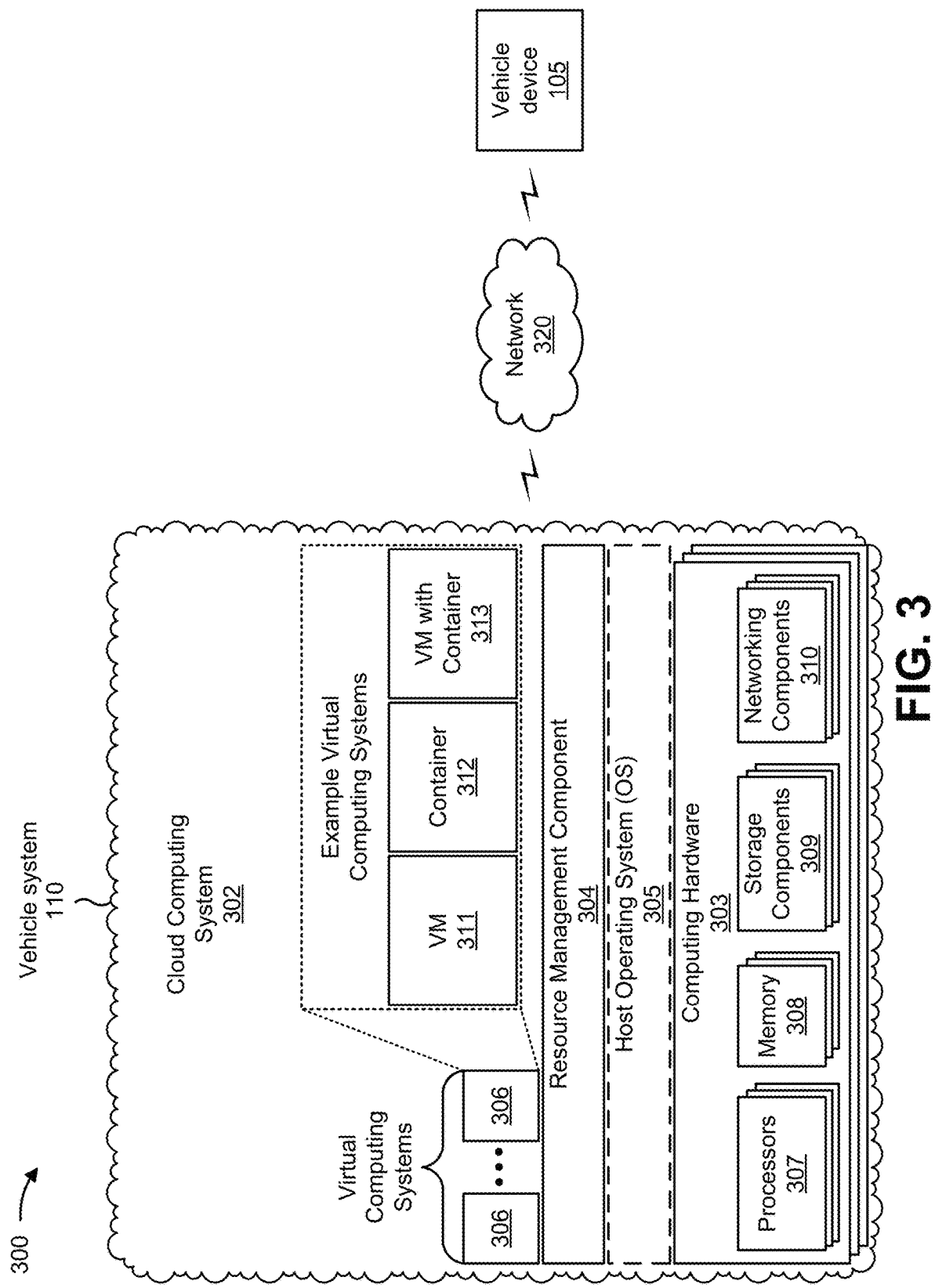
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the vehicle device 105 and the vehicle system 110, which may include one or more elements of and/or may execute within a cloud computing system 302. The cloud computing system 302 may include one or more elements 303-313, as described in more detail below. As further shown in FIG. 3, environment 300 may include a network 320. Devices and/or elements of environment 300 may interconnect via wired connections and/or wireless connections.

The vehicle device 105 includes devices capable of receiving, generating, storing, processing, and/or providing information, as described elsewhere herein. The vehicle device 105 may include a communication device and/or a computing device. For example, the vehicle device 105 may include a telematics device, a video camera, a dashboard camera, an inertial measurement unit, a three-axis accelerometer, a gyroscope, a global positioning system (GPS) device, an on-board diagnostics (OBD) device, a vehicle tracking unit, an electronic control unit (ECU), a user device (e.g., a cellular telephone, a laptop computer, and/or the like), among other examples.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the vehicle system 110 may include one or more elements 303-313 of the cloud computing system 302, may execute within the cloud computing system 302, and/or may be hosted within the cloud computing system 302, in some implementations, the vehicle system 110 may not be cloud-based (e.g., may be implemented outside of a cloud computing system) or may be partially cloud-based. For example, the vehicle system 110 may include one or more devices that are not part of the cloud computing system 302, such as device 300 of FIG. 3, which may include a stand-alone server or another type of computing device. The vehicle system 110 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
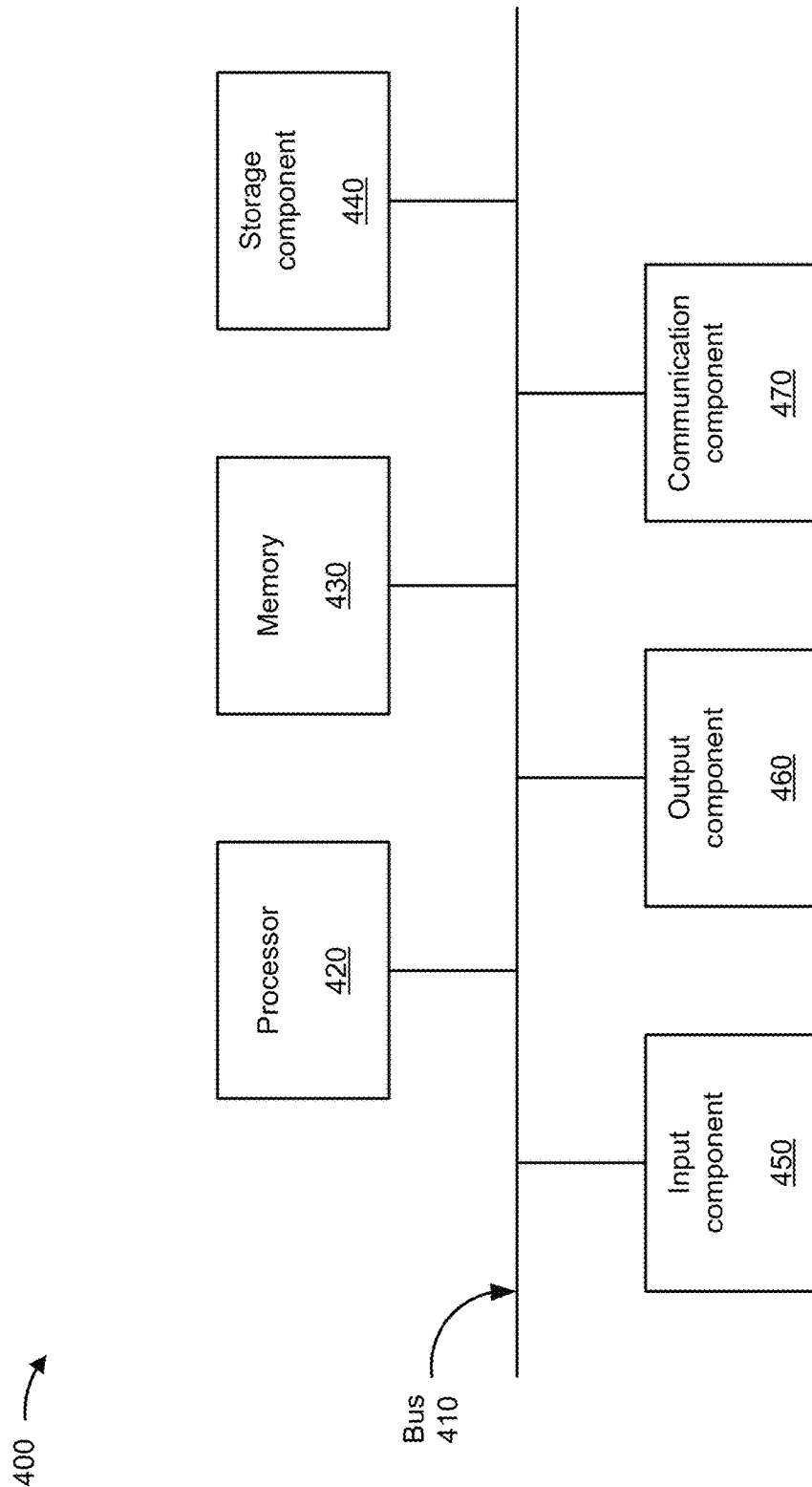
FIG. 4 is a diagram of example components of one or more devices of FIG. 3.

FIG. 4 is a diagram of example components of one or more devices of FIG. 3. The components may be components of a device 400, which may correspond to the vehicle device 105 and/or the vehicle system 110. In some implementations, the vehicle device 105 and/or the vehicle system 110 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with utilizing a machine learning model to predict hazardous driving conditions based on audio data. In some implementations, one or more process blocks of FIG. 5 may be performed by a vehicle device (e.g., the vehicle device 105). In some implementations, one or more process blocks of FIG. 5 may be performed by another device or a group of devices separate from or including the vehicle device, such a vehicle system (e.g., the vehicle system 110). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving audio data and other vehicle data associated with a vehicle (block 510). For example, the vehicle device may receive audio data and other vehicle data associated with a vehicle, as described above. In some implementations, the other vehicle data includes data identifying one or more of a location of the vehicle, an acceleration of the vehicle, a velocity of the vehicle, gyroscope data associated with the vehicle, or video data associated with the vehicle.

As further shown in FIG. 5, process 500 may include transforming the audio data to transformed audio data in a frequency domain (block 520). For example, the vehicle device may transform the audio data to transformed audio data in a frequency domain, as described above. In some implementations, transforming the audio data to the transformed audio data in the frequency domain includes applying a transform (e.g., a short time Fourier transform) to the audio data to convert the audio data to the transformed audio data in the frequency domain.

As further shown in FIG. 5, process 500 may include segmenting the transformed audio data into a plurality of audio segments (block 530). For example, the vehicle device may segment the transformed audio data into a plurality of audio segments, as described above.

As further shown in FIG. 5, process 500 may include processing the plurality of audio segments, with different feature extraction techniques, to extract a plurality of feature vectors (block 540). For example, the vehicle device may process the plurality of audio segments, with different feature extraction techniques, to extract a plurality of feature vectors, as described above. In some implementations, processing the plurality of audio segments, with the different feature extraction techniques, to extract the plurality of feature vectors includes extracting Mel-frequency cepstral coefficient feature vectors for the plurality of audio segments; extracting spectral centroid and spectral roll off feature vectors for the plurality of audio segments; extracting zero crossing and maximum root mean square feature vectors for the plurality of audio segments; and extracting chroma feature vectors for the plurality of audio segments; wherein the plurality of feature vectors includes the Mel-frequency cepstral coefficient feature vectors, the spectral centroid and spectral roll off feature vectors, the zero crossing and maximum root mean square feature vectors, and the chroma feature vectors.

As further shown in FIG. 5, process 500 may include merging the plurality of feature vectors into a merged feature vector (block 550). For example, the vehicle device may merge the plurality of feature vectors into a merged feature vector, as described above. In some implementations, merging the plurality of feature vectors into the merged feature vector includes merging the Mel-frequency cepstral coefficient feature vectors, the spectral centroid and spectral roll off feature vectors, the zero crossing and maximum root mean square feature vectors, and the chroma feature vectors into the merged feature vector.

As further shown in FIG. 5, process 500 may include creating an audio signature for the audio data based on the merged feature vector (block 560). For example, the vehicle device may create an audio signature for the audio data based on the merged feature vector, as described above.

As further shown in FIG. 5, process 500 may include processing the audio signature and the other vehicle data (e.g., with a machine learning model, a YAAPT pitch tracking model, identification and tracking of voice formats, and/or the like) to determine a classification of the audio signature (block 570). For example, the vehicle device may process the audio signature and the other vehicle data (e.g., with a machine learning model, a YAAPT pitch tracking model, identification and tracking of voice formats, and/or the like) to determine a classification of the audio signature, as described above. In some implementations, the machine learning model may be trained based on a plurality of audio samples associated with vehicle operation, hazardous events, and severities of the hazardous events. In some implementations, the classification of the audio signature includes one or more of a screeching tire classification, a squealing classification, a glass shattering classification, an engine noise level classification, a harsh weather condition classification, a hazardous road condition classification, a normal vehicle operation classification, a loud music classification, or a continuous exposure to noise classification.

As further shown in FIG. 5, process 500 may include performing one or more actions based on the classification of the audio signature (block 580). For example, the vehicle device may perform one or more actions based on the classification of the audio signature, as described above. In some implementations, performing the one or more actions includes one or more of notifying a driver of the vehicle, and drivers located within a predetermined distance from the vehicle, about a hazardous event based on the classification; automatically lowering a volume of music in the vehicle based on the classification; or limiting exposure of a driver of the vehicle to a loud noise level over a time period based on the classification.

In some implementations, performing the one or more actions includes one or more of causing a driver of the vehicle to be registered for a defensive driving course based on the classification, causing the classification to be utilized for a crash scene investigation, or notifying an emergency service about a hazardous event based on the classification. In some implementations, performing the one or more actions includes receiving feedback associated with the classification and retraining the machine learning model based on the feedback.

Process 500 may include additional implementations, such as any single implementation or any combination of implementations described below and/or in connection with one or more other processes described elsewhere herein.

In some implementations, process 500 includes applying a low-pass filter to the audio data that remove noise and personal information from the audio data.

In some implementations, process 500 includes receiving the machine learning model, wherein the machine learning model was trained based on a plurality of audio samples associated with vehicle operation, hazardous events, and severities of the hazardous events.

In some implementations, process 500 includes filtering the audio data to remove in-cabin conversation, music, weather audio, road noise, and/or cabin ambient noise from the audio data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a vehicle device, audio data and other vehicle data associated with a vehicle;
  receiving, by the vehicle device, a machine learning model that was trained based on a plurality of audio samples associated with hazardous events;
  transforming, by the vehicle device, the audio data to transformed audio data in a frequency domain;
  segmenting, by the vehicle device, the transformed audio data into a plurality of audio segments;
  processing, by the vehicle device, the plurality of audio segments, with different feature extraction techniques, to extract a plurality of feature vectors;
  merging, by the vehicle device, the plurality of feature vectors into a merged feature vector;
  creating, by the vehicle device, an audio signature for the audio data based on the merged feature vector;
  processing, by the vehicle device, the audio signature and the other vehicle data, with the machine learning model, to determine a classification of the audio signature; and
  performing, by the vehicle device, one or more actions based on the classification of the audio signature.

2. The method of claim 1, further comprising:
  applying a low-pass filter to the audio data that removes noise and personal information from the audio data.

3. The method of claim 1, wherein transforming the audio data to the transformed audio data in the frequency domain comprises:
applying a transform to the audio data to convert the audio data to the transformed audio data in the frequency domain.

4. The method of claim 1, wherein processing the plurality of audio segments, with the different feature extraction techniques, to extract the plurality of feature vectors comprises:
extracting Mel-frequency cepstral coefficient feature vectors for the plurality of audio segments;
extracting spectral centroid and spectral roll off feature vectors for the plurality of audio segments;
extracting zero crossing and maximum root mean square feature vectors for the plurality of audio segments; and
extracting chroma feature vectors for the plurality of audio segments,
wherein the plurality of feature vectors includes the Mel-frequency cepstral coefficient feature vectors, the spectral centroid and spectral roll off feature vectors, the zero crossing and maximum root mean square feature vectors, and the chroma feature vectors.

5. The method of claim 4, wherein merging the plurality of feature vectors into the merged feature vector comprises:
merging the Mel-frequency cepstral coefficient feature vectors, the spectral centroid and spectral roll off feature vectors, the zero crossing and maximum root mean square feature vectors, and the chroma feature vectors into the merged feature vector.

6. The method of claim 1, wherein the other vehicle data includes data identifying one or more of:
a location of the vehicle,
an acceleration of the vehicle,
a velocity of the vehicle,
gyroscope data associated with the vehicle, or
video data associated with the vehicle.

7. The method of claim 1, wherein performing the one or more actions comprises:
notifying a driver of the vehicle, and drivers located within a predetermined distance from the vehicle, about a hazardous event based on the classification;
automatically lowering a volume of music in the vehicle based on the classification; or
limiting exposure of a driver of the vehicle to a loud noise level over a time period based on the classification.

8. A vehicle device, comprising:
one or more processors configured to:
receive a model,
wherein the model was trained based on a plurality of audio samples associated with hazardous events;
receive audio data and other vehicle data associated with a vehicle;
transform the audio data to transformed audio data in a frequency domain;
segment the transformed audio data into a plurality of audio segments;
process the plurality of audio segments, with different feature extraction techniques, to extract a plurality of feature vectors;
merge the plurality of feature vectors into a merged feature vector;
create an audio signature for the audio data based on the merged feature vector;
process the audio signature and the other vehicle data, with the model, to determine a classification of the audio signature; and
perform one or more actions based on the classification of the audio signature.

9. The vehicle device of claim 8, wherein the classification of the audio signature includes one or more of:
a screeching tire classification,
a squealing classification,
a glass shattering classification,
an engine noise level classification,
a harsh weather condition classification,
a hazardous road condition classification,
a normal vehicle operation classification,
a loud music classification, or
a continuous exposure to noise classification.

10. The vehicle device of claim 8, wherein the one or more processors, to perform the one or more actions, are configured to one or more of:
notify a driver of the vehicle, and drivers located within a predetermined distance from the vehicle, about a hazardous event based on the classification;
automatically lower a volume of music in the vehicle based on the classification; or
limit exposure of a driver of the vehicle to a loud noise level over a time period based on the classification.

11. The vehicle device of claim 8, wherein the one or more processors, to perform the one or more actions, are configured to one or more of:
cause a driver of the vehicle to be registered for a defensive driving course based on the classification;
cause the classification to be utilized for a crash scene investigation; or
notify an emergency service about a hazardous event based on the classification.

12. The vehicle device of claim 8, wherein the one or more processors, to perform the one or more actions, are configured to:
receive feedback associated with the classification; and
retrain the model based on the feedback.

13. The vehicle device of claim 8, wherein the one or more processors are further configured to:
filter the audio data to remove in-cabin conversation, music, weather audio, road noise, and/or cabin ambient noise from the audio data.

14. The vehicle device of claim 8, wherein the other vehicle data includes data identifying one or more of:
a location of the vehicle,
an acceleration of the vehicle,
a velocity of the vehicle,
gyroscope data associated with the vehicle, or
video data associated with the vehicle.

15. A non-transitory computer-readable medium storing a set of instructions, the set of instructions comprising:
one or more instructions that, when executed by one or more processors of a vehicle device, cause the vehicle device to:
receive a machine learning model that was trained based on a plurality of audio samples associated with vehicle operation, hazardous events, and severities of the hazardous events;
receive audio data and other vehicle data associated with a vehicle;
transform the audio data to transformed audio data in a frequency domain;
segment the transformed audio data into a plurality of audio segments;

process the plurality of audio segments, with different feature extraction techniques, to extract a plurality of feature vectors;
merge the plurality of feature vectors into a merged feature vector;
create an audio signature for the audio data based on the merged feature vector;
process the audio signature and the other vehicle data, with the machine learning model, to determine a classification of the audio signature; and
perform one or more actions based on the classification of the audio signature.

16. The non-transitory computer-readable medium of claim 15, wherein the one or more instructions further cause the vehicle device to:
apply a low-pass Butterworth filter to the audio data to remove noise and personal information from the audio data.

17. The non-transitory computer-readable medium of claim 15, wherein the one or more instructions, that cause the vehicle device to transform the audio data to the transformed audio data in the frequency domain, cause the vehicle device to:
apply a short time Fourier transform to the audio data to convert the audio data to the transformed audio data in the frequency domain.

18. The non-transitory computer-readable medium of claim 15, wherein the one or more instructions, that cause the vehicle device to process the plurality of audio segments, with the different feature extraction techniques, to extract the plurality of feature vectors, cause the vehicle device to:
extract Mel-frequency cepstral coefficient feature vectors for the plurality of audio segments;
extract spectral centroid and spectral roll off feature vectors for the plurality of audio segments;
extract zero crossing and maximum root mean square feature vectors for the plurality of audio segments; and
extract chroma feature vectors for the plurality of audio segments,
wherein the plurality of feature vectors includes the Mel-frequency cepstral coefficient feature vectors, the spectral centroid and spectral roll off feature vectors, the zero crossing and maximum root mean square feature vectors, and the chroma feature vectors.

19. The non-transitory computer-readable medium of claim 18, wherein the one or more instructions, that cause the vehicle device to merge the plurality of feature vectors into the merged feature vector, cause the vehicle device to:
merge the Mel-frequency cepstral coefficient feature vectors, the spectral centroid and spectral roll off feature vectors, the zero crossing and maximum root mean square feature vectors, and the chroma feature vectors into the merged feature vector.

20. The non-transitory computer-readable medium of claim 15, wherein the one or more instructions, that cause the vehicle device to perform the one or more actions, cause the vehicle device to one or more of:
notify a driver of the vehicle, and drivers located within a predetermined distance from the vehicle, about a hazardous event based on the classification;
automatically lower a volume of music in the vehicle based on the classification;
limit exposure of a driver of the vehicle to a loud noise level over a time period based on the classification;
register a driver of the vehicle for a defensive driving course based on the classification;
utilize the classification for a crash scene investigation; or
notify an emergency service about a hazardous event based on the classification.

* * * * *